United States Patent [19]

Wottka et al.

[11] Patent Number: 4,551,294
[45] Date of Patent: Nov. 5, 1985

[54] MOLDING COMPOSITION BASED ON VINYL CHLORIDE POLYMERS, AND PROCESS FOR THE MANUFACTURE OF FILMS FROM THESE MOLDING COMPOSITIONS FOR THE PRODUCTION OF FORGERY-PROOF VALUABLE DOCUMENTS

[75] Inventors: Bernhard Wottka, Kastl; Alfred Weindl, Altötting, both of Fed. Rep. of Germany

[73] Assignee: Heochst Aktiengesellschaft, Fed. Rep. of Germany

[21] Appl. No.: 657,690

[22] Filed: Oct. 4, 1984

[30] Foreign Application Priority Data

Oct. 8, 1983 [DE] Fed. Rep. of Germany ....... 3336647

[51] Int. Cl.$^4$ .......................... B29D 7/14; C08L 1/02; C08L 27/06
[52] U.S. Cl. ....................................... 264/175; 427/7; 524/35
[58] Field of Search ............... 524/35; 427/7; 264/175

[56] References Cited

U.S. PATENT DOCUMENTS

| | | | |
|---|---|---|---|
| 3,679,448 | 7/1972 | Tramposch | 427/7 |
| 3,679,449 | 7/1972 | Nagot et al. | 427/7 |
| 4,405,730 | 9/1983 | Cohen | 524/35 |

Primary Examiner—Allan M. Lieberman
Attorney, Agent, or Firm—Connolly and Hutz

[57] ABSTRACT

The novel molding compositions with vinyl chloride polymer as the main constituent contain, in a specific quantity in each case, certain impact strength modifiers, polymethyl methacrylate and a special cellulose, namely powdered pure cellulose having a mean degree of polymerization of 300 to 1,000 and a maximum particle diameter of 0.09 mm. These molding compositions can readily be calendered. The films are particularly suitable for the production of forgery-proof valuable documents which can be personalized by means of a laser, for example credit cards.

4 Claims, No Drawings

MOLDING COMPOSITION BASED ON VINYL CHLORIDE POLYMERS, AND PROCESS FOR THE MANUFACTURE OF FILMS FROM THESE MOLDING COMPOSITIONS FOR THE PRODUCTION OF FORGERY-PROOF VALUABLE DOCUMENTS

The invention relates to a molding composition based on vinyl chloride polymers, for the manufacture of films for the production of forgery-proof valuable documents, these being forgery-proof for the reason that the valuable documents produced can be personalized only by means of a laser. The invention also relates to a process for the manufacture of these films.

Valuable documents, such as identity cards, credit cards and check cards, should be of such a nature that it is impossible or extremely difficult to produce forged or falsified items.

With respect to the structure, the known valuable documents as a rule represent a laminate of at least 2, preferably 3, layers (films) of the same or different plastics or of plastic and preferably paper or metal. Thus, as is known, credit cards are at present in use which are built up from 3 layers, the two outer layers (protective layers) being composed of a transparent or glass-clear polyvinyl chloride film, and the inner layer (the core) being composed of paper or a polyvinyl chloride film dyed in a dull color.

Although the currently common paper core credit card can be personalized, that is to say inscribed, by means of a laser and is thus forgery-proof to a high degree (due to the expensive and complicated technical equipment which is necessary for personalization by laser), it also has a number of disadvantages, such as a low dimensional stability and hence a restricted suitability for automatic machines, a relatively high sensitivity to folding and fracture, a short life and relatively easy delamination. Furthermore, the sharpness of the lettering is assessed as unsatisfactory.

The currently common credit cards of plastic films as the core and as the protective layers (all-plastic credit cards) evidently have several advantages as compared with the paper core credit card, but they have the following considerable disadvantage: they are personalized (inscribed) by means of embossing, which does not ensure high security against forgeries. Moreover, the security against forgeries cannot be substantially improved by the known measures such as incorporation of magnetic strips or electrophotographic images.

The molding compositions for the manufacture of the films, which are used for producing the credit cards described above, consist essentially of vinyl chloride polymers as the main constituent, of methyl methacrylate/butadiene/styrene polymers or acrylonitrile/butadiene/styrene polymers as modifiers for improving the impact strength of the vinyl chloride polymers, of conventional heat stabilizers and lubricants for vinyl chloride polymers and, if appropriate, of colorants and fillers, such as titanium dioxide and chalk. These molding compositions can be calendered and extruded with relative ease. The calendered films and extruded films obtained also have a surface quality which is satisfactory with respect to the production of valuable documents. However, the all-plastic valuable documents, which are produced with these and are advantageous per se, have a relatively low security against forgeries, as already described above.

Plastic films for the production of valuable documents should also ensure especially a high processing speed (machine speed) in the production of the valuable documents, in addition to high security against forgeries. To obtain a high processing speed, they must have a good surface quality, i.e. a surface which, in particular, is free from so-called fissures. This is because the fissures in the surface of the film lead to faults, for example when the film is imprinted and when the film blanks are compression-molded to give the desired laminates.

It is therefore the object of the invention to provide a molding composition which is based on vinyl chloride polymers and which is distinguished by good calenderability and extrusibility, preferably calenderability, and gives films which are outstandingly suitable for the production of valuable documents, because they have the required surface quality and the valuable documents produced can be personalized only by means of a laser.

The molding composition according to the invention, based on vinyl chloride polymers, consists essentially of (A) 5 to 20% by weight of an impact strength modifier for vinyl chloride polymers, selected from the group comprising acrylonitrile/butadiene/styrene polymers, methyl methacrylate/butadiene/styrene polymers, methyl methacrylate/acrylonitrile/butadiene/styrene polymers and chlorinated polyethylene, (B) 0.5 to 25% by weight of powdered pure cellulose which has a mean degree of polymerization of 300 to 1,000 and the particles of which have a maximum diameter of 0.09 mm, (C) 1 to 5% by weight of polymethyl methacrylate and (D) vinyl chloride polymer in such a quantity that the sum of the weights of (A), (B), (C) and (D) gives 100% by weight, and additionally (E) an effective quantity of a lubricant and heat stabilizer for vinyl chloride polymers.

It was surprising that, in spite of the content of powdered cellulose, the molding composition according to the invention can be readily extruded and even calendered, and gives films which, in particular, have those properties which are desired for the production of valuable documents of the most diverse types. Admittedly, German Auslegeschrift 2,514,691 and U.S. Pat. Nos. 4,104,207 and 4,250,064 have disclosed molding compositions based on vinyl chloride polymers and having a content of cellulose. However, these molding compositions differ from those according to the invention not only with respect to their qualitative and quantitative composition, but also with respect to the type of the cellulose. Compared with the new ones, the known molding compositions are furthermore intended for quite different purposes.

The impact strength modifiers, to be used according to the invention, for polyvinyl chloride (component A) are polymers of acrylonitrile, butadiene and styrene (ABS), methyl methacrylate, butadiene and styrene (MBS), methyl methacrylate, acrylonitrile, butadiene and styrene (MABS) and chlorinated polyethylene (CPE). The ABS, MBS and MABS polymers each have a butadiene content of preferably at least 35% by weight, relative to the total polymer. ABS polymers with a butadiene content of 40 to 70% by weight, a styrene content of 20 to 40% by weight and an acrylonitrile content of 10 to 25% by weight, in each case relative to the total polymer, MBS polymers with a butadiene content of 40 to 70% by weight, a styrene content of 10 to 20% by weight and a methyl methacrylate content of 10 to 50% by weight, in each case relative to the total polymer, and MABS polymers with a butadiene content of 40 to 60% by weight, a styrene content of 25 to 40% by weight, a methyl methacrylate content of 15 to 30% by weight and an acrylonitrile content of less than 10% by weight, in each case relative to the total polymer, have proved to be particularly suitable.

The chlorinated polyethylene as an impact strength modifier for polyvinyl chloride represents chlorination products of polyethylene or of copolymers of ethylene with small proportions, preferably at most 1 to 5 mole %, of propene or butene-1. The ethylene polymer which is chlorinated can have been produced by the low-pressure process or high-pressure process. Chlorinated low-pressure polyethylene is preferred. The mean molecular weight of the chlorinated polyethylene is advantageously 10,000 to 100,000, preferably 20,000 to 50,000 (calculated from the chlorine content and the molecular weight of the starting polyethylene as determined by gel chromatography; cf. the journal "Makromolekulare Chemie" [Macromolecular Chemistry], Volume 26, year 1958, pages 96 to 101, published by Dr. Alfred Hüthig, Heidelberg, Federal Republic of Germany). The chlorine content is advantageously 20 to 50% by weight, preferably 30 to 42% by weight, relative to the chlorinated polyethylene.

The quantity of impact strength modifier is preferably 10 to 15% by weight, relative to the weight of the molding composition comprising the components (A), (B), (C) and (D).

The cellulose to be used according to the invention (component B) is a powdered pure cellulose, which has a mean degree of polymerization of 300 to 1,000, preferably 400 to 950, and the particles of which have a maximum diameter of 0.09 mm, preferably 0.02 to 0.03 mm.

The word "pure" is intended to express the fact that the cellulose to be used according to the invention is essentially composed of D-glucopyranose molecules with β(1.4)-glucosidic links, and is thus not a chemically modified or chemically refined cellulose, such as alkylcellulose, carboxyalkylcellulose or rayon. The cellulose selected according to the invention is thus a powdered cellulose of vegetable origin (particularly wood), which has been freed from lignin and other accompanying substances, has been purified, and is not chemically modified or refined. Such celluloses are commercially available, for example under the name ARBOCEL ®-CELLUOSE ( ®=registered trade mark of J. Rettenmaier und Söhne, Füllstoff-Fabriken [Filler works] of Holzmühle, Federal Republic of Germany). The quantity of cellulose, in the case where the films produced are to be glass-clear or transparent, is 0.5 to 5% by weight, preferably 1 to 3% by weight, relative to the weight of the molding composition comprising the components (A), (B), (C) and (D). If, however, the films are to be dulled, the quantity of cellulose is 8 to 25% by weight, preferably 10 to 16% by weight, relative to the weight of the molding composition comprising the components (A), (B), (C) and (D).

The polymethyl methacrylate (component C) to be used according to the invention is a polymer of the ester of methacrylic acid and methanol (methyl methacrylate). The degree of polymerization of the polymethyl methacrylate can vary within wide limits. Preferred polymethyl methacrylates have a relative viscosity of 1.2 to 20, preferably 4 to 10 (measured in a 1% by weight solution in chloroform, by means of the Ubbelohde viscometer with the Oa capillary).

The quantity of polymethyl methacrylate in the molding composition according to the invention amounts preferably to 1.5 to 3% by weight, relative to the weight of the molding composition comprising the components (A), (B), (C) and (D).

The vinyl chloride polymers or polyvinyl chlorides (component D) to be used according to the invention can be homopolymers and/or copolymers of vinyl chloride. In the copolymers, the proportion of polymerized vinyl chloride units is at least 70% by weight, preferably at last 85% by weight, relative to the weight of the polymer.

The following monomers are particularly suitable for the copolymerization of vinyl chloride: olefins, such as ethylene and propylene; vinyl esters of carboxylic acids having 2 to 4 carbon atoms, such as vinyl acetate and vinyl propionate; vinyl halides, such as vinylidene chloride; unsaturated acids such as maleic acid, fumaric acid, arcylic acid and methacrylic acid and their esters with alcohols having 1 to 10 carbon atoms; acrylonitrile; styrene; and cyclohexylmaleimide.

For the graft polymerization of vinyl cloride, elastomeric polymers are particularly suitable which are obtained by polymerization from one or more of the following monomers: dienes, such as butadiene and cyclopentadiene; olefins, such as ethylene and propylene; styrene; unsaturated acids, such as acrylic acid and methacrylic acid and their esters with alcohols having 1 to 10 carbon atoms; and acrylonitrile.

Preferred vinyl chloride polymers are homopolymers of vinyl chloride and copolymers of vinyl chloride with vinyl acetate. These polymers are produced advantageously by the bulk polymerization process, suspension polymerization process or emulsion polymerization process at a low level of emulsifier (less than 3% by weight of emulsifier, relative to the polymer).

The K values (DIN 53,726) of the vinyl chloride polymers are advantageously 50 to 80, preferably 54 to 67.

The quantity of polyvinyl chloride, the main constituent of the molding compositions according to the invention, is preferably at least 68% by weight, relative to the sum of the weights of the components (A), (B), (C) and (D), and, including the indicated preferred quantities of the components (A), (B) and (C), this gives the preferred quantity range from 68 to 87.5% by weight for polyvinyl chloride.

As the heat stabilizers (component E) for the molding compositions according to the invention, based on polyvinyl chloride, the conventional organo-tin sulfur compounds, aminocrotonic acid esters, urea derivatives and thiourea derivatives and/or salts of the alkaline earth metals and of zinc are preferably used. The organo-tin sulfur stabilizers, such as dimethyl-tin, dibutyl-tin and dioctyl-tin bis-2-ethylhexylthioglycollate are preferred. The effective quantity of stabilizer is usually 0.5 to 3% by weight, preferably 1 to 2.0% by weight, relative to the quantity by weight of polyvinyl chloride (component D).

As the lubricant (component E), preferably the following conventional compounds are used: stearic acid, montanic acid, glycerol esters such as glycerol monooleate, bis-palmitoyl-ethylenediamine, bis-stearoyl-ethylenediamine, and montanic acid esters of ethanediol or 1,3-butanediol, partially saponified if appropriate. The effective quantity of lubricant is usually 0.1 to 2.5% by weight, preferably 0.5 to 1.5% by weight, relative to the quantity by weight of polyvinyl chloride (component D).

If appropriate, the molding compositions according to the invention, having a defined content of powdered pure cellulose, contain further fillers, preferably titanium dioxide and chalk (calcium carbonate), in a quantity of 1 to 15% by weight, preferably 3 to 10% by weight, relative to the quantity by weight of polyvinyl chloride (component D). The chalk can be treated (coated) or untreated chalk. The particles of the pulverulent fillers chalk and titanium dioxide have in general a diameter of 0.001 to 0.015 mm, preferably 0.005 to 0.008 mm.

The molding compositions according to the invention are prepared by mixing the individual components together, which is advantageously carried out in a mixer conventional in plastics processing.

The molding compositions according to the invention are processed into films by extrusion and, preferably, by calendering. Calendering is preferably carried out in such a way that the molding composition is (a) pre-gelled at a temperature from 140° to 180° C., preferably 150° to 170° C., advantageously in a kneader and/or a roll mill comprising at least two rolls, and (b) the pre-gelled material is calendered to give the film on a calender, which preferably comprises four or five rolls, at a roll temperature of 180° to 225° C., preferably 190° to 210° C., the rolls being heated individually in such a way that the first and last rolls have approximately the same temperature and the intervening rolls have temperatures which are 5° to 10° C. higher than those of the other two rolls (high-temperature calendering process). The calendered film is drawn off from the last calender roll, cooled by means of cooling rolls and, as a rule, fed to a winding device.

The thickness of the film is in general 0.1 to 1.0 mm, preferably 0.2 to 0.7 mm.

The molding compositions according to the invention can be readily calendered and extruded. They can also be calendered without difficulty at relatively high speed. The calendered films have a good surface quality. Their surface is free of fissures and other faults (specks). These films are particularly suitable for the production of valuable documents, for example credit cards. As already mentioned above, credit cards in general comprise a core film which is covered on both sides with a protective film (overlay film). The core film should be dull and readily imprintable. Preferred molding compositions according to the invention for the production of core films consist essentially of 5 to 20% by weight, preferably 10 to 15% by weight, of component (A), 8 to 25% by weight, preferably 10 to 16% by weight, of component (B), 1 to 5% by weight, preferably 1.5 to 3% by weight, of component (C), vinyl chloride polymer as the component (D), lubricant and heat stabilizers as the component (E) and additionally fillers selected from the group comprising titanium dioxide and chalk, in a quantity of 1 to 15% by weight, preferably 3 to 10% by weight, as the component (F).

It is surprising that, precisely due to the filler combination, according to the invention, of cellulose, chalk and/or titanium dioxide, a molding composition is obtained which can readily be calendered and gives films which are particularly good also with respect to dullness and imprintability.

The protective film should be glass-clear or at least transparent. Preferred molding compositions according to the invention for the manufacture of such films consist essentially of 5 to 20% by weight, preferably 10 to 15% by weight, of the component (A), 0.5 to 5% by weight, preferably 1 to 3% by weight, of the component (B), 1 to 5% by weight, preferably 1.5 to 3% by weight, of the component (C), vinyl chloride polymer as the component (D), and lubricant and heat stabilizer as the component (E).

The core films and protective films described can readily be combined to give laminates, because these films can also be readily compression-molded (press temperature 120° to 150° C.). The valuable documents, such as credit cards, thus obtained are extremely forgery-proof, because they can be personalized only by means of an expensive laser apparatus (when subjected to a laser, the cellulose contained in the film blackens due to combustion). As can be seen, the protective films of such a laminate also contain the cellulose proposed according to the invention. In fact, it has been found that pure cellulose also has a positive, additional influence on the ability to be treated by a laser and hence on the sharpness of the lettering, if small quantities thereof are also employed in the protective film (overlay film).

Thus, the calendered films manufactured from the molding compositions acccording to the invention have all those valuable properties which are desired for the production of valuable documents, and the valuable documents produced are distinguished by high security against forgeries.

The invention will now be explained in yet more detail, by reference to examples.

EXAMPLES 1 TO 8 AND COMPARISON EXAMPLES 1 AND 2

The examples and comparison examples are summarized in the table which follows.

The components listed were mixed in a high-speed mixer customary in plastics processing, and the mixtures were pre-gelled in an extruder at temperatures from 150° to 170° C. The individual pre-gelled molding compositions were calendered on a calender having 4 rolls. Depending on the molding composition, the temperature of the calender rolls was 190° to 210° C. The thickness of the individual films was 0.2 mm in each case.

The calenderability of the molding compositions, the surface quality of the film and the sharpness of the lettering on credit cards personalized by means of a laser and produced from the films, were rated on a scale from 1 to 3: 1=unsatisfactory, 2=good, 3=very good.

The gloss of the two film surfaces according to ASTM D 523, as well as the tensile strength and the elongation at break according to DIN 53,455, both in the longitudinal direction (l) and in the transverse direction (q), were also measured on the films. The results are in the table.

The credit cards (laminates) on which the ability to be inscribed by means of a laser and the sharpness of the lettering were tested, had the following structure:

The films from Examples 1, 2 and 5 each represented the outer layer (the protective films) in laminates with paper as the core layer.

The films from Examples 3, 4, 6, 7 and 8 each represented the core layer in laminates with the film from Example 2 as the outer layer.

The films from comparison Example 1 represented the core layer in a laminate with the film from comparison Example 2 as the outer layer.

The film from comparison Example 2 represented the outer layer in a laminate with paper as the core layer.

Below, the components indicated in abbreviated form in the table, are described in more detail:

PVC[1] is a vinyl chloride homopolymer of K value 57,
PVC[2] is a vinyl chloride homopolymer of K value 60,
PVC[3] is a copolymer of K value 60, obtained from 90% by weight of vinyl chloride and 10% by weight of vinyl acetate,
PVC[4] is a vinyl chloride homopolymer of K value 54,
CPE[1] is a chlorinated polyethylene of 39% by weight chlorine content and a mean molecular weight of 20,000,
CPE[2] is a chlorinated polyethylene of 34% by weight chlorine content and a mean molecular weight of 45,000,
ABS is a polymer of 24% by weight of acrylonitrile, 48% by weight of butadiene and 28% by weight of styrene,
MABS is a polymer of 18% by weight of methyl methacrylate, 3% by weight of acrylonitrile, 42% by weight of butadiene and 37% by weight of styrene,
MBS is a polymer of 16% by weight of methyl methacrylate, 66% by weight of butadiene and 18% by weight of styrene,
PMMA is a polymethyl methacrylate having a relative viscosity of 6.2 (Examples 1, 2, 5 and comparison Examples 1 and 2) and of 4.1 (other examples),
Cellulose: In Example 8, powdered pure cellulose having a mean degree of polymerization of 950 and a maximum particle size of 0.08 mm was used and, in the other examples, a cellulose having a mean degree of polymerization of 400 and a maximum particle size of 0.04 mm was used.

group comprising the acrylonitrile/butadiene/styrene polymers, methyl methacrylate/butadiene/styrene polymers, methyl methacrylate/acrylonitrile/butadiene/styrene polymers, each of said polymers having a butadiene content of at least about 35% by weight relative to the total polymer, and chlorinated ethylene polymer, said chlorinated ethylene polymer having a chlorine content of about 20 to 50% by weight relative to the chlorinated ethylene polymer and having a mean molecular weight of about 10,000 to 100,000 when calculated from the chlorine content and the molecular weight of the starting ethylene polymer as determined by gel chromatography;

B. 0.5 to 25% by weight of powdered pure cellulose which has a mean degree of polymerization of 300 to 1,000 and the particles of which have a maximum diameter of 0.09 mm;

C. 1 to 5% by weight of polymethyl methacrylate; and

D. vinyl chloride polymer having at least about 70% by weight polymerized vinyl chloride units relative to the weight of the polymer, in such a quantity that the sum of the weights of said components A, B, C and D gives 100% by weight; and additionally E. about 0.1 to 2.5% by weight of lubricant and about 0.5 to 3% by weight of heat stabilizer for said vinyl chloride polymer, both relative to the quantity by weight of said component D.

2. The molding composition as claimed in claim 1, in which the quantity of cellulose is 0.5 to 5% by weight.

3. The molding composition as claimed in claim 1, in which the quantity of cellulose is 8 to 25% by weight and which contains, as a component F, further fillers

TABLE

|  | Examples | | | | | | | | Comparison examples | |
|---|---|---|---|---|---|---|---|---|---|---|
|  | 1 | 2 | 3 | 4 | 5 | 6 | 7 | 8 | 1 | 2 |
| PVC[1] | 92 | — | 76 | — | — | 68 | — | — | 55.5 | — |
| PVC[2] | — | — | — | 25 | — | — | — | 32 | — | — |
| PVC[3] | — | 81 | — | 30 | 71 | — | 44.0 | 50 | 30 | 92 |
| PVC[4] | — | — | — | — | — | — | 28.5 | — | — | — |
| CPE[1] | — | — | — | 10 | — | — | — | — | — | — |
| CPE[2] | — | — | — | — | — | — | — | 8 | — | — |
| ABS | — | — | 10 | — | — | — | 12 | — | — | — |
| MABS | — | — | — | 10 | — | 15 | — | — | 13 | 6 |
| MBS | 5 | 13 | — | — | 18 | — | — | — | — | — |
| PMMA | 2 | 3 | 4 | 5 | 5 | 1 | 1.5 | 2 | 1.5 | 2 |
| Cellulose | 1 | 3 | 10 | 20 | 5 | 16 | 14 | 8 | — | — |
| Titanium dioxide | — | — | 4 | 6 | — | 10 | 12 | 5 | 6 | — |
| Heat stabilizer | 2.1 | 2.5 | 1.8 | 1.5 | 2.1 | 2.0 | 1.8 | 1.8 | 1.8 | 2.1 |
| Lubricant | 0.6 | 0.8 | 0.4 | 1.0 | 0.6 | 0.4 | 0.4 | 0.5 | 0.5 | 0.6 |
| TOTAL | 102.7 | 103.3 | 106.2 | 108.5 | 101.7 | 112.4 | 114.2 | 107.3 | 108.3 | 102.7 |
| Sharpness of lettering | 3 | 3 | 3 | 3 | 3 | 3 | 3 | 3 | 1 | 2 |
| Calenderability | 3 | 3 | 3 | 2 | 3 | 2 | 3 | 3 | 3 | 3 |
| Film surface | 3 | 3 | 3 | 2 | 3 | 2 | 2 | 3 | 3 | 3 |
| Gloss (%) | 77/82 | 44/54 | 22/35 | 11/14 | 31/41 | 13/17 | 15/19 | 16/26 | 69/71 | 80/85 |
| Tensile strength (N/mm$^2$) l/t | 58/54 | 47/43 | 51/47 | 40/32 | 47/39 | 48/36 | 52/43 | 57/51 | 44/43 | 51/47 |
| Elongation at break (%) l/t | 18/9 | 12/9 | 100/23 | 9/7 | 26/9 | 32/21 | 7/7 | 7/6 | 113/50 | 100/23 |

We claim:

1. A molding composition based on vinyl chloride polymers, for the manufacture of films for the production of forgery-proof valuable documents, consisting essentially of A. 5 to 20% by weight of an impact strength modifier for vinyl chloride polymers, selected from the selected from the group comprising titanium dioxide and chalk in a quantity of 1 to 15% by weight, relative to the weight of vinyl chloride polymer.

4. A process for the manufacture of calendered films from the molding compositions as claimed in claim 1, which comprises pre-gelling the molding composition at a temperature from 150° to 170° C., and calendering the pre-gelled material on a calender comprising four or five calender rolls at a temperature from 190° to 210° C. to give a film, the rolls being heated individually in such a way that the first and last rolls have approximately the same temperature and the intervening rolls have temperatures which are 5° to 10° C. higher than those of the other two rolls.

* * * * *